Dec. 16, 1947.     O. O. KRUSE     2,432,525
DRYING OVEN
Filed July 6, 1942
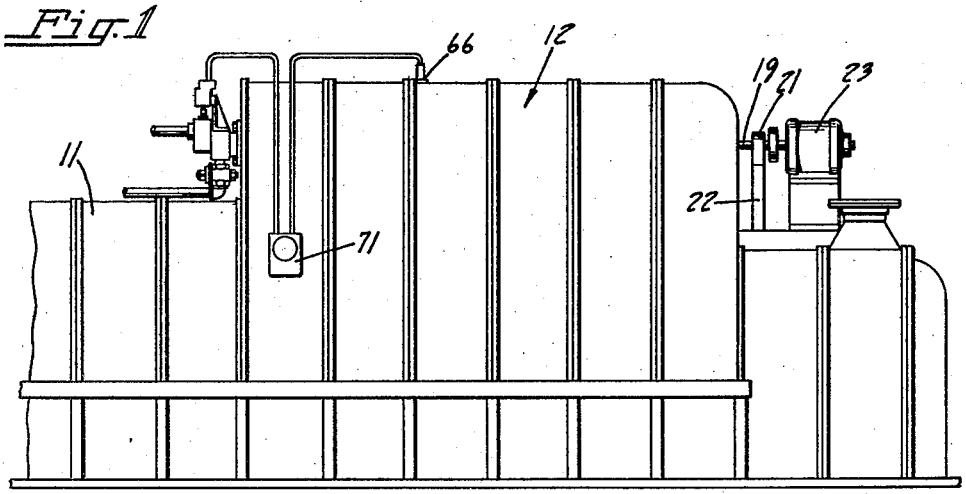
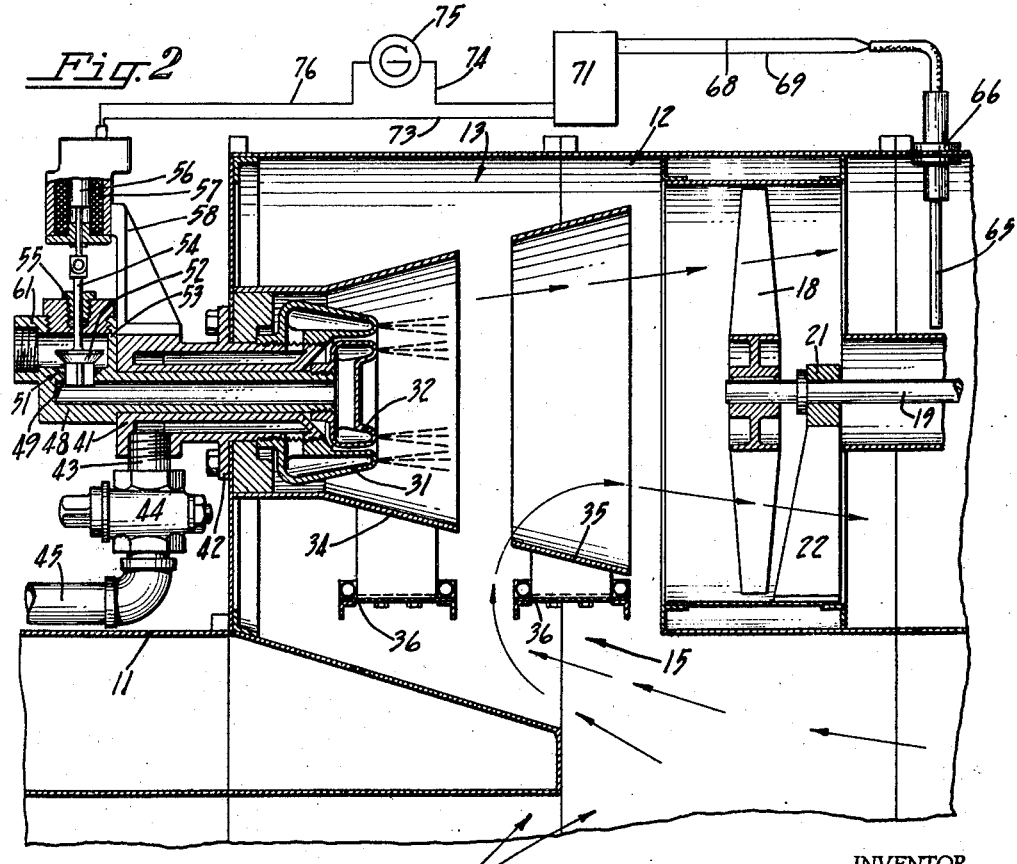
INVENTOR.
Orlin O. Kruse
BY Ivan D. Thornburgh
Charles H. Erne
ATTORNEYS Patented Dec. 16, 1947

2,432,525

UNITED STATES PATENT OFFICE 2,432,525

DRYING OVEN

Orlin O. Kruse, Oak Park, Ill., assignor to American Can Company, New York, N. Y., a corporation of New Jersey Application July 6, 1942, Serial No. 449,938

2 Claims. (Cl. 263—19)

1

The present invention relates to ovens for drying coated or lithographed metallic sheets or the like and has particular reference to controlling the temperature of the interior of the oven.

An object of the instant invention is the provision in a drying oven of heat regulating devices wherein the heat introduced into the oven is controlled and regulated at a place adjacent the heating devices and prior to its entrance into the oven so that burning and other heat damage to the work passing through the oven will be prevented.

Another object is the provision in such a drying oven of devices for heating the oven which include a pair of cooperating heating elements one of which is controlled to augment the heat output of the other so that a predetermined required temperature may be constantly maintained in the oven.

Numerous other objects and advantages of the invention will be apparent as it is better understood from the following description, which, taken in connection with the accompanying drawings, discloses a preferred embodiment thereof.

Referring to the drawing:

Figure 1 is a side view of a portion of a drying oven embodying the instant invention; and Fig. 2 is an enlarged fragmentary longitudinal section taken through that portion of the oven containing the heating devices, the view including a wiring diagram of the electric apparatus used in the oven.

As a preferred embodiment of the invention the drawing illustrates a portion of a sheet drying oven of the character disclosed in United States Patent 1,591,683, issued July 6, 1926, to C. G. Preis. In such an oven freshly coated or lithographed sheets of tin plate or the like material are conveyed through a drying chamber in an upright or "on-edge" position while heated air is circulated through the chamber to dry the coating on the sheets.

In the instant oven the sheets to be dried are conveyed through a drying chamber A (Fig. 2) which is enclosed by a sheet metal sectional shell or casing 11 (Fig. 1) which includes a heat circulating section 12. The circulating section houses a heating duct 13 which is formed in the upper portion of the circulating section and which communicates by way of openings 15 with the drying chamber A. There preferably are two of these openings 15, one not shown but located at the right of the one shown in Fig. 2. The opening shown is the return opening for the heated air coming from the chamber into the duct. The other opening is the air entrance opening from the duct into the chamber.

The air within the chamber together with fresh air introduced into the chamber, is circulated

2 therethrough by a continuously rotating fan 18 which is located within the heating duct 13. The fan is mounted on a horizontal shaft 19 journaled in bearings 21 formed in bearing brackets 22 located inside and also outside of the duct. Outside of the duct the fan shaft is driven in any suitable manner by an electric motor 23.

The air circulated through the drying chamber A is heated by a pair of cooperating gas burners 31, 32 which are located adjacent the return opening 15 of the duct 13. These burners are annular or ring shaped burners. Burner 31 is the main burner and burner 32 is a smaller auxiliary burner that fits within the main burner. These burners are disposed in horizontal alignment with the fan 18 and are surrounded by a flared shield 34 which directs the heat from the burners into the region of the fan.

A cooperating tapered deflector 35 spaced between the shield 34 and the fan 18 permits air, returning from the chamber A by way of the return opening 15, to mingle with the heat waves from the burners. This guides these air waves into the fan. The shield and the deflector are mounted on cross-beams 36 the ends of which are secured to the sides of the oven casing 11.

The main burner 31 is threaded onto the inner end of a hollow horizontal sleeve 41 which extends through the end wall of the duct 13 and which is formed with a flange 42 bolted to this end wall. The outer end of the sleeve is connected by way of a pipe nipple 43 to a shut-off valve 44 which in turn is connected to a gas supply pipe 45. Pipe 45 leads from any suitable supply of gas.

The auxiliary burner 32 is threaded onto the inner end of a tubular body 48 that extends through the sleeve 41. At the outer end of the tubular body an inlet opening 49 is located and this is surrounded by a tapered valve seat 51 for a shut-off valve 52 located within a valve casing 53 formed on the body 48. The valve 52 is formed on the lower end of a vertical valve stem 54 that extends up through a stuffing box 55 threaded into the valve casing 53. The upper end of the valve stem is connected to a movable core 56 of a solenoid 57 secured to a bracket 58 bolted to the main burner sleeve 41. The valve casing 53 is formed with a pipe connection 61 located above the valve 52 for a pipe that may lead from the same supply of gas hereinbefore mentioned.

Thus each burner 31, 32 has a separate connection with the supply of gas and has a separate valve for regulating the flow of gas into the burners. These burners heat the air circulated through the drying chamber A as hereinbefore mentioned and, as the air passes through the duct 13 toward the chamber, the fan thoroughly mixes the air. This overcomes and prevents stratification. As the heated air leaves the fan it is the proper temperature for entrance into the drying chamber.

Provision is made for maintaining the heat of the drying chamber A at a predetermined constant temperature by way of a thermo-electric couple 65 placed in the path of travel of the heated air circulated through the oven. For best results it has been found that the temperature of the air is controlled best at a place near the discharge side of the fan 18. The thermo-electric couple 65 is located at this place and is secured against displacement by a holder 66 that extends through the top of the duct 13.

The thermo-couple 65 is connected by wires 68, 69 to a conventional temperature control relay 71 bolted to the side of the oven casing 11. The control relay is connected by a wire 73 to one side of the valve solenoid 57. The relay is connected further by a wire 74 to a suitable source of electric energy such as a generator 75. The generator is connected by way of a wire 76 to the opposite side of the valve solenoid 57.

Hence any change beyond a predetermined degree in the temperature of the air leaving the fan 18, as detected by the thermo-couple 65, reacts through the control relay 71 on the solenoid 57 and thus opens or closes the valve 52 and thereby regulates the operation of the auxiliary burner 32. Normally the solenoid 57 is in a de-energized condition so that the valve 52 remains closed against its seat 51 and thus cuts off the burner 32 from its source of gas. Thus normally the auxiliary burner is prevented from operating.

The main burner 31 remains in operation continuously and its control valve 44 is set to supply just sufficient gas to the burner to give off heat slightly less than the required predetermined temperature. Hence when the temperature of the air leaving the fan is at this slightly reduced heat, the thermo-couple 65 operates to energize the solenoid 57 and thus open the auxiliary valve 52.

This opening of the valve permits gas to flow into the auxiliary burner 32. The gas immediately ignites from the flame of the main burner 31 and thereupon the heat from the auxiliary burner augments the main burner heat. As soon as the temperature of the heated air has reached the required amount, the thermo-couple again operates to de-energize the solenoid 57. This closes the auxiliary valve 52 and cuts off the auxiliary burner 32.

In this manner the auxiliary burner 32 is brought into operation periodically with any deficiency fluctuation of the temperature of the heated air as it leaves the fan 18. It is this close-up control of air temperature at the heat source that keeps the oven chamber at a constant predetermined temperature. This prevents burning and other heat damage to coating on the sheets which pass through the oven for drying.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an oven for drying coated metallic sheets advanced therethrough, the combination of means in said oven for circulating heated air in a continuous open stream through and entirely within the oven in contact with the moving sheets, a valve controlled main heating element disposed in said oven adjacent said air stream for providing the major amount of heat contacting the sheets moving through the oven, a valve controlled auxiliary heating element also disposed in the oven adjacent said main heating element for increasing the heat imparted to said circulated open air stream when the temperature thereof falls below the degree necessary to maintain the oven at the required sheet drying temperature, said circulating means being disposed in front of said heating elements, detector means located in said air stream within the oven at a point adjacent and in advance of said circulating means for determining the temperature of the heated air to be circulated in contact with the sheets, and means responsive to and operable by said detector means for actuating said auxiliary heating element to increase the heat imparted to the air stream by said main heating element when the temperature of the heated air stream within the oven falls below said required degree.

2. In an oven for drying coated metallic sheets advanced therethrough, the combination of a fan located in said oven for circulating heated air in a continuous open stream through and entirely within the oven in contact with the moving sheets, a valve controlled main burner disposed in said oven adjacent said air stream for providing the major amount of heat contacting the sheets moving through the oven, a valve controlled auxiliary burner also disposed in the oven adjacent said main burner for increasing the heat imparted to said circulated open air stream when the temperature thereof falls below the degree necessary to maintain the oven at the required sheet drying temperature, deflector means disposed in the oven between said burners and said fan for directing the heated air stream to the fan, said fan and said deflector means being disposed in front of said burners, detector means located in said air stream within the oven at a point adjacent and in advance of said fan for determining the temperature of the heated air to be circulated in contact with the sheets, and electro-mechanical means responsive to and operable by said detector means for actuating said auxiliary burner to increase the heat imparted to the air stream by said main burner when the temperature of the heated air stream within the oven falls below said required degree.

ORLIN O. KRUSE.

REFERENCES CITED

The following references are of record in the file of this patent:

UNITED STATES PATENTS

| Number | Name | Date |
|---|---|---|
| 2,040,328 | Olson | May 12, 1936 |
| 2,300,560 | Faber | Nov. 3, 1942 |
| 2,184,975 | MacConville et al. | Dec. 26, 1939 |
| 1,935,632 | Handley | Nov. 21, 1933 |
| 1,819,560 | Klees | Aug. 18, 1931 |
| 2,308,555 | Tate | Jan. 19, 1943 |
| 1,332,182 | Leeds | Feb. 24, 1920 |
| 2,051,401 | Winterstein | Aug. 18, 1936 |
| 2,288,616 | Freund | July 7, 1942 |
| 1,857,447 | Angels | May 10, 1932 |
| 1,282,825 | Harvey | Oct. 29, 1918 |
| 1,327,675 | Hornung | Jan. 13, 1920 |